United States Patent [19]

Ballard

[11] 3,838,579

[45] Oct. 1, 1974

[54] LOCKING AND SEALING SYSTEM FOR ROOM AIR CONDITIONERS

[75] Inventor: James L. Ballard, Ellicott City, Md.

[73] Assignee: General Electric Company, Louisville, Ky.

[22] Filed: Nov. 12, 1973

[21] Appl. No.: 415,149

[52] U.S. Cl. .......................... 62/262, 62/298, 62/302, 49/490

[51] Int. Cl. .......................... F25d 23/12

[58] Field of Search .......................... 62/262, 298, 302

[56] References Cited

UNITED STATES PATENTS

| | | | |
|---|---|---|---|
| 2,638,755 | 5/1953 | Borgerd | 62/262 |
| 2,799,062 | 7/1957 | Callan | 62/262 |
| 2,994,211 | 8/1961 | Lehmkuhl | 62/262 |

*Primary Examiner*—William J. Wye

*Attorney, Agent, or Firm*—Francis H. Boos

[57] ABSTRACT

A system is provided in an air conditioner including an outer cabinet arranged in a room opening, an inner chassis removably mounted in the cabinet, for locking and sealing the chassis to the cabinet to prevent passage of outside elements between the cabinet and the chassis.

3 Claims, 2 Drawing Figures

LOCKING AND SEALING SYSTEM FOR ROOM AIR CONDITIONERS

BACKGROUND OF THE INVENTION

1. Field of the Invention

The present invention relates to a room air conditioner including an outer case or cabinet mountable in a room opening having a machine supporting chassis removably positioned in the cabinet and more particularly to an arrangement for positively locking and sealing the chassis to the cabinet to prevent the passage of outside elements between chassis and cabinet. The positive locking and sealing function in the present invention is accomplished automatically during the process of inserting the chassis into the cabinet. A cam system is employed, to automatically index the chassis in proper location relative to the cabinet so that a resilient gasket is compressed between the chassis and cabinet while effecting the engagement of a latching system to positively lock the chassis to the cabinet.

2. Description of the Prior Art

In some prior art room air conditioners that have a cabinet or outer wall sleeve mounted through a wall and a chassis removably positioned in the cabinet, the chassis has been secured to the outer cabinet by screws which compressed a gasket to insure a tight fit.

Other prior art devices such as disclosed in U.S. Pat. No. 2,994,211 to Lehmkuhl disclose sealing systems that automatically locate and seal the chassis to the wall cabinet during insertion of the chassis. While a seal between the chassis and cabinet has been provided the gaskets disclosed in the patent are of the type having freely moveable sealing lips or legs that lightly engage contracting surfaces. The use of this type of gasket may not consistently provide uniform and or complete sealing. This is especially true in the event the sealing edge of the gasket becomes wavy or irregular due to age or environmental conditions.

SUMMARY

By this invention there is provided in an air conditioner of the type including an outer cabinet arranged in a room opening and an inner chassis removably positioned in the cabinet a system for automatically locking and sealing the chassis to the cabinet. A latching means and sealing gasket are cooperatively arranged between the cabinet and chassis to respectively lock and seal the cabinet to the chassis. A cam system including a cam on the chassis and cooperating cam surface on the cabinet is effective to lift the chassis to align the latching means during the insertion of the chassis into the cabinet and for causing the continuous insertion and lowering of the chassis into the cabinet so that the latching means engages to lock the chassis to the cabinet and the gasket is compressed between the chassis and the cabinet to prevent passage of outside elements between the chassis and cabinet.

DESCRIPTION OF THE PREFERRED EMBODIMENTS

Figure 1:
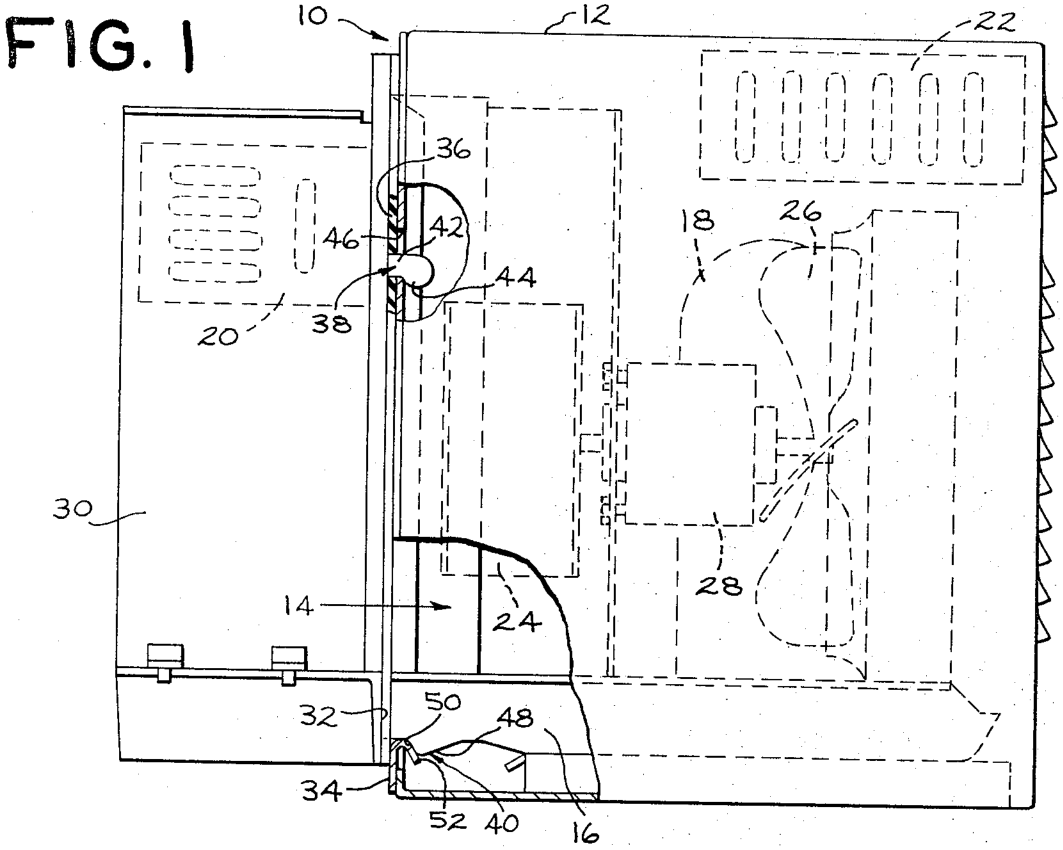
FIG. 1 is a sectional view of an air conditioner illustrating the locking and sealing arrangement between the cabinet and chassis.
Figure 2:
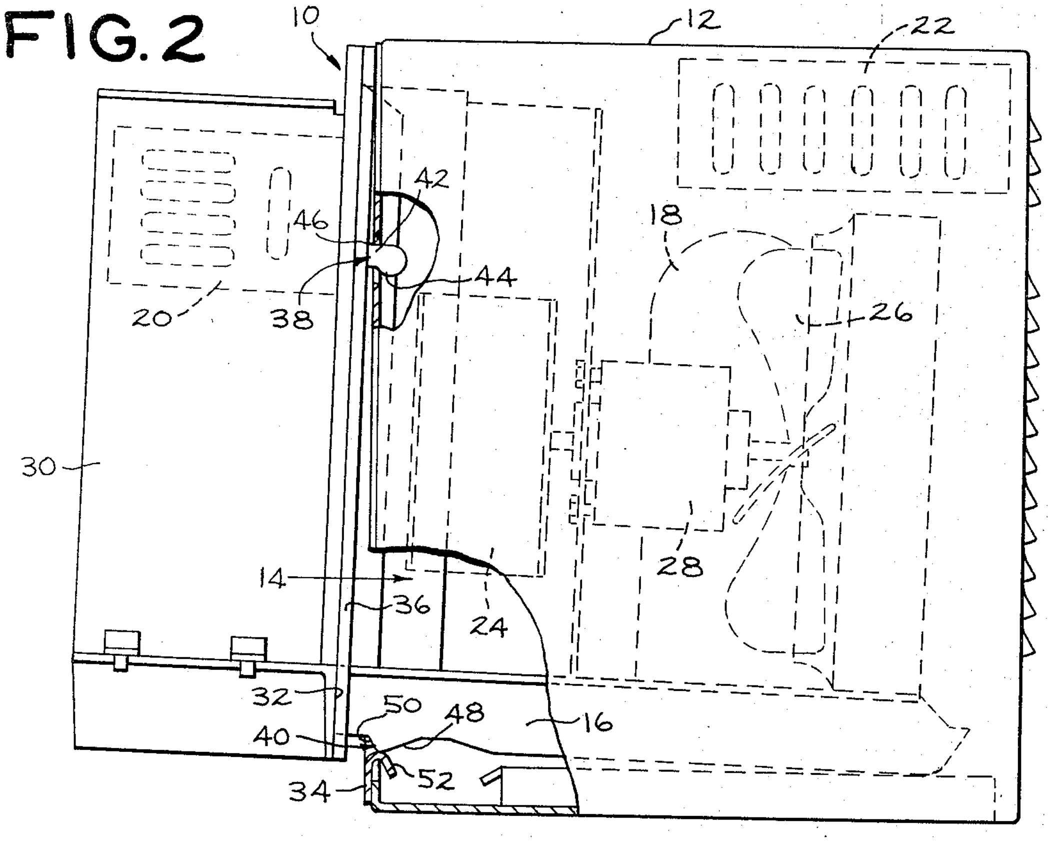
FIG. 2 is a sectional view of the air conditioner showing a chassis insertion in the cabinet.

Referring now to the drawings and initially to FIG. 1 thereof, there is illustrated an air conditioner 10 which is arranged to be positioned within an opening in an enclosure (not shown). The unit includes a cabinet or outside wall sleeve 12 arranged in a wall opening and is provided with a front opening 14 disposed in the enclosure to be air conditioned. The refrigerant system is mounted on a frame or chassis 16 as will hereinafter be explained in detail is removably arranged in the cabinet 12. The system includes the usual compressor 18, evaporator 20, and condenser 22. There is also provided the usual evaporator fan 24 for directing air from the enclosure through the evaporator 20 and back into the enclosure and a condenser fan 26 for drawing outside air through the condenser to provide the necessary cooling. Both the evaporator fan 24 and condenser fan 26 are driven by a common motor 28. Referring now to FIGS. 1 and 2 an evaporator and control housing 30 is formed on the front portion of the chassis 16 and is adapted to project into the enclosure when the chassis is properly located in the cabinet 12. Provided around the rear edge portion of housing 30 and continuing across the bottom of the chassis 16 is a frame or sealing surface member 32. The sealing member 32 is dimensioned to mate with and engage a frame member 34 arranged around opening 14 of cabinet 12. The sealing member 32 as shown in FIG. 1 provides the dividing wall between the portion of the refrigerant system disposed in the cabinet 12 and in communication with outside elements and the portion of the refrigerant system including the evaporator located in the housing 30 disposed as mentioned hereinabove within the enclosure to be air conditioned. Secured to the sealing surface 32 of housing 30 is a resilient gasket 36 which is adapted to engage the frame member 34 of cabinet 12 as will hereinafter be explained serves to seal the chassis 16 to the cabinet 12.

In the illustrated embodiment of the present invention the sealing and locking of the chassis 16 to the cabinet 12 is accomplished by the utilization of a latching means 38 and cam means 40. Projecting from each of the vertically disposed side portions of the member 32 is a tab 42 having a downwardly projecting latch portion 44. The tab 42 is located on the member 32 so as to cooperatively engage a slot means 46 located on each of the vertical side portions of frame 34. To facilitate the entry of the tab 42 into the slot 46 and to cause compression of the gasket 36 between the members 32 and 34 the cam means 40 in the present embodiment are formed integral with the bottom wall of chassis 16 and are located below each of the tabs 42. Each of the cam means 40 is provided with a front camming surface 48 adapted to engage the upper edge of the lower portion of frame member 34 and a rear camming surface 50 arranged to cooperate with a cam surface 52 formed on the rear of the lower portion of the frame member 34.

As the chassis is inserted into the cabinet 12 through opening 14 the front cam surface 48 engages the upper edge portion of the lower wall section of frame member 34 to lift the chassis 16 as the camming surface 48 rides up the lower wall of frame member 34 as shown in FIG. 2. In this position the apex of cam means 40 is riding on the top edge of the bottom wall section of frame 34 and tab 42 is in alignment with its corresponding slot 46. The continued movement of chassis 16 into the cabinet 12 past the cam apex causes the chassis 16 to move inwardly and downwardly into cabinet 12 through the action of rear cam surface 50 riding down the cam surface 52 on frame 34. The movement of chassis 16 into the cabinet 12 causes the tab 42 to enter the slot 46 while the downwardly movement of chassis 16 causes the latch portion 44 of tab 42 to engage with the slot 46 to positively lock the chassis 16 to the cabinet 12. It should be understood that the action of the cams 50, 52 while effective to cause the locking action of the latching means 38 also effects the sealing of the chassis 16 to the cabinet 12 by compressing the gasket 36 between members 32 and 34 to prevent the passage of outside elements between the chassis 16 and cabinet 12.

While in accordance with the Patent Statutes, there has been described what, at present, is considered to be the preferred embodiment of the invention, it will be obvious to those skilled in the art that various changes and modifications may be made thereto without departing from the invention, and it is intended therefore in the appended claims to cover all such changes and modifications as fall within the true spirit and scope of this invention.

What is claimed as new and is desired to be secured by Letters Patent of the United States is:

1. An air conditioner, comprising:

an outer cabinet having an opening at one end thereof;

an inner chassis removably positioned in said cabinet;

a frame member arranged around said opening;

a sealing surface member on said chassis corresponding in size and shape to said frame member;

latching means including a tab means on one of said members arranged to engage slot means on the other of said members;

a resilient gasket arranged to be engaged between said sealing surface member and said frame member when said chassis is positioned in said cabinet;

cam means on said chassis including a front cam surface engaging said frame member for lifting said chassis during its insertion through said opening into said cabinet for aligning said tab means with said slot means; and a back cam surface on said cam means for causing the continuing insertion and lowering of said chassis on said frame member and into said cabinet so that said latching means engage to lock said chassis to said cabinet and said gasket is compressed between said frame means and said sealing surface to seal said chassis to said frame.

2. An air conditioner according to claim 1 wherein:

said chassis includes a base pan having a support portion extending into said cabinet from said sealing surface member, and said cam means are formed integral with the underside of said support portion adjacent said sealing surface member.

3. An air conditioner according to claim 2 wherein:

said locking means includes at least two tab means located on vertically disposed portions of said sealing surface member, and said slot means being located on complimentary vertically disposed portions of said frame member.

* * * * *